United States Patent
Grausam et al.

(10) Patent No.: US 11,007,486 B2
(45) Date of Patent: May 18, 2021

(54) METHOD FOR DETERMINING A PERMEATION PROPERTY OF HOLLOW FIBRE MEMBRANES

(71) Applicant: FRESENIUS MEDICAL CARE DEUTSCHLAND GMBH, Bad Homburg (DE)

(72) Inventors: Elmar Grausam, St. Wendel (DE); Ingo Fehr, Bonn (DE)

(73) Assignee: FRESENIUS MEDICAL CARE DEUTSCHLAND GMBH, Bad Homburg (DE)

(*) Notice: Subject to any disclaimer, the term of this patent is extended or adjusted under 35 U.S.C. 154(b) by 130 days.

(21) Appl. No.: 16/343,414

(22) PCT Filed: Oct. 23, 2017

(86) PCT No.: PCT/EP2017/076960
§ 371 (c)(1),
(2) Date: Apr. 19, 2019

(87) PCT Pub. No.: WO2018/077782
PCT Pub. Date: May 3, 2018

(65) Prior Publication Data
US 2019/0247798 A1     Aug. 15, 2019

(30) Foreign Application Priority Data
Oct. 24, 2016 (DE) .................... 10 2016 012 730.9

(51) Int. Cl.
*B01D 65/10* (2006.01)
*B01D 69/08* (2006.01)
(Continued)

(52) U.S. Cl.
CPC .......... *B01D 65/10* (2013.01); *B01D 63/021* (2013.01); *B01D 69/08* (2013.01); *G01N 15/0806* (2013.01); *G01N 2015/084* (2013.01)

(58) Field of Classification Search
CPC ... B01D 65/10; B01D 69/08; G01N 2015/084
See application file for complete search history.

(56) References Cited

U.S. PATENT DOCUMENTS 4,678,573 A * 7/1987 Otstot .................... B01D 53/22
                                                  210/321.89
5,110,477 A      5/1992 Howard et al.
(Continued)

FOREIGN PATENT DOCUMENTS

EP      0923955 A2    6/1999

OTHER PUBLICATIONS

International Preliminary Report on Patentability issued in corresponding International Patent Application No. PCT/EP2017/076960 dated Apr. 30, 2019 (6 pages).
(Continued)

*Primary Examiner* — John Fitzgerald
(74) *Attorney, Agent, or Firm* — Kilyk & Bowersox, P.L.L.C.

(57) ABSTRACT

The invention relates to a method of determining a permeation property of hollow-fibre membranes wherein the permeation property of the hollow-fibre membrane is determined on a hollow-fibre membrane bundle which has been introduced into a housing and has terminally open hollow-fibre membranes at a first end of the hollow-fibre membrane bundle and terminally closed hollow-fibre membranes at a second end of the hollow-fibre membrane bundle. The invention more particularly relates to a method of determining the clearance, more particularly the diffusive clearance of hollow-fibre membranes.

15 Claims, 4 Drawing Sheets

(51) Int. Cl.
    *B01D 63/02*    (2006.01)
    *G01N 15/08*    (2006.01)

(56) References Cited

U.S. PATENT DOCUMENTS

| | | | | |
|---|---|---|---|---|
| 6,270,674 | B1* | 8/2001 | Baurmeister | B01D 15/08 |
| | | | | 210/321.79 |
| 7,803,214 | B2* | 9/2010 | Kase | B01D 71/64 |
| | | | | 95/54 |
| 8,580,012 | B2* | 11/2013 | Hoshino | D01F 6/74 |
| | | | | 95/50 |
| 9,764,288 | B2* | 9/2017 | Johnson | B01D 63/02 |
| 9,821,251 | B2* | 11/2017 | Tanizaki | B01D 63/04 |
| 9,950,300 | B2* | 4/2018 | Hara | B01D 71/56 |
| 10,456,751 | B2* | 10/2019 | Yoshimune | B01D 63/021 |
| 2008/0017029 | A1* | 1/2008 | Kase | B01D 53/22 |
| | | | | 95/50 |
| 2011/0048229 | A1* | 3/2011 | Hoshino | B01D 69/08 |
| | | | | 95/50 |
| 2013/0264251 | A1* | 10/2013 | Johnson | B01D 63/02 |
| | | | | 210/106 |
| 2015/0209735 | A1* | 7/2015 | Hara | B01D 67/0016 |
| | | | | 210/321.87 |
| 2016/0158670 | A1* | 6/2016 | Tanizaki | B41J 2/17563 |
| | | | | 347/93 |
| 2018/0078907 | A1* | 3/2018 | Yoshimune | D01F 9/24 |
| 2019/0168167 | A1* | 6/2019 | Shimura | B01D 67/0018 |
| 2019/0240625 | A1* | 8/2019 | Grausam | A61M 1/16 |
| 2019/0330085 | A1* | 10/2019 | Shimura | B01D 67/0027 |
| 2020/0070098 | A1* | 3/2020 | Ichihara | C02F 9/00 |

OTHER PUBLICATIONS

International Search Report and Written Opinion issued in corresponding International Patent Application No. PCT/EP2017/076960 (with English translation of International Search Report) dated Feb. 20, 2018 (10 pages).

\* cited by examiner

METHOD FOR DETERMINING A PERMEATION PROPERTY OF HOLLOW FIBRE MEMBRANES

This application is a National Stage Application of PCT/EP2017/076960, filed Oct. 23, 2017, which claims priority to German Patent Application No. 10 2016 012 730.9, filed Oct. 24, 2016.

FIELD OF THE INVENTION

The invention relates to a method of determining a permeation property of hollow-fibre membranes. More particularly, the invention relates to a method of determining the clearance and more particularly the diffusive clearance of hollow-fibre membranes from a quantified permeation property.

The invention further relates to an apparatus for carrying out a method of determining the permeation properties of hollow-fibre membranes in a hollow-fibre membrane bundle and also to the use thereof.

The invention further relates to a method of producing hollow-fibre membrane bundles from hollow-fibre membranes having predetermined permeation properties.

BACKGROUND OF THE INVENTION

Hollow-fibre membranes are widely used in the purification of liquids. More particularly, hollow-fibre membranes are employed in biomedical engineering for water treatment and blood cleansing, particularly in the dialysis of renally insufficient patients. Hollow-fibre membranes of this type are assembled as hollow-fibre membrane bundles into filter modules. Such filter modules for blood cleansing have come to be formed on a mass production scale.

The construction of hollow-fibre membrane filter modules and the production of hollow-fibre membranes for dialysis are known in the prior art (Uhlenbusch-Körwer, Bonnie-Schorn, Grassmann, Vienken, "Understanding Membranes and Dialysers" Publisher: Pabst Science Publishers, 2004).

Hollow-fibre membranes used for blood cleansing frequently consist of polysulphone (PSU) and polyvinylpyrrolidone (PVP) and are generally produced in a dry-wet spinning process. In processes of this type, a spinning solution containing the polymers PSU and PVP and a solvent is extruded through an annular die to spin a hollow filament. The spun filament is initially led perpendicularly through an air gap. Concurrently with the extrusion of the spun filament, a coagulation medium is extruded into the lumen of the spun filament so that a coagulation process ensues inside the spun filament. Coagulation is accompanied by phase inversion to form sol and gel phases within the spun filament. After passing through the air gap, the spun filament is introduced into a coagulation bath where the coagulation of the spun filament is completed to form the solid structure of a hollow-fibre membrane. The hollow-fibre membrane obtained then passes through a plurality of rinse baths and drying zones. The hollow-fibre membranes obtained differ in pore structure according to pre-set spinning conditions. The term "PSU" herein is to be understood as a generic term for any polymers with sulphone groups, including for example polyether sulphone and polyphenyl sulphone and copolymers comprising same.

In general, a multiplicity of hollow-fibre membranes are extruded simultaneously and concurrently in a production plant so that the hollow-fibre membrane fibres obtained after passing through the production plant are combinable into a filament sheet or fibre bundle and are taken up by a reel.

The process for producing hollow-fibre membranes is a continuous process run as a three-shift operation in the production sites. There is accordingly a constant need to monitor the quality of the fibres obtained in order to avoid faulty production to any significant extent. Tests are therefore carried out on a continuous basis to check whether the properties of the hollow-fibre membrane obtained are on spec and the production process is proceeding in accordance with the pre-set conditions.

Depending on process conditions, different hollow-fibre membranes having different permeation properties are obtainable, examples being high flux or low flux hollow-fibre membranes. Corresponding hollow-fibre membranes differ in their separation characteristics and thereby are useful for different methods of therapy, for example in the dialysis of renally insufficient patients. To quantify the permeation properties of hollow-fibre membranes it was hitherto necessary first to assemble the hollow-fibre membrane bundles obtained into filter modules before the separation properties of the membrane could be ascertained in a test method, for example as described in DIN/EN/ISO 8637:2014.

To construct filter modules, the hollow-fibre membrane bundles have to be impressed into a filter housing and terminally potted. The potting compounds for the hollow-fibre membrane bundle at the fibre ends are curable resins, in particular polyurethane. Potting and curing are time-consuming operations. Filter module construction and the subsequent analyses on the filters in the plant labs may take several hours. All the while hollow-fibre membranes continue to be produced. In the extreme case, the analytical results some hours later will show that the hollow-fibre membrane obtained is no longer on spec, so the manufacturing output of several hours has to be discarded.

When, by contrast, the analytical results show that the hollow-fibre membranes obtained do meet the specifications, the corresponding output in terms of manufactured hollow-fibre membranes may be further processed into the corresponding filter modules.

As mentioned above, hollow-fibre membrane filter modules of this type are used for the haemodialysis of renally insufficient patients. The haemodialysis of renally insufficient patients is based on the principle of the transmembrane type of mass transfer. In haemodialysis, blood flows along the hollow interior of the hollow-fibre membranes, also called lumens, while an appropriate type of dialysis liquid flows on the outside surface. The liquids flow in opposite directions, giving rise to a countercurrent type of filtration.

Depending on the filtration conditions in blood treatment of renally insufficient patients, undesirable metabolites such as, for example, urea, creatinine, β2-microglobulin, interleukin-6, phosphate are removed from the blood by permeating through the membrane wall and being taken up by the dialysis liquid. Similarly, dissolved constituents of the dialysis liquid may also permeate through the membrane wall onto the blood side. The dialysis liquid is provided as an aqueous physiological solution containing electrolytes (e.g. $Na^+$, $K^+$, $Mg^{2+}$, $Ca^{2+}$, $Cl^-$), glucose and a buffer (e.g. $NaHCO_3$).

The transmembrane type of mass transfer in the above-outlined scheme of haemodialysis or blood cleansing may in principle take place in two ways, by convective transfer or diffusive transfer.

In convective transfer, liquid, and substances present therein, permeates through the membrane along a transmembrane pressure gradient. In diffusive transfer, substances permeate through the membrane by virtue of the dissolved substances' intrinsic molecular motion and a concentration gradient across the membrane wall.

Depending on the type of the hollow-fibre membrane and/or the pore size of the hollow-fibre membrane and the established rate of flow for blood and dialysate, the filtration process may proceed in one way or the other. When, for example, the blood treatment in a haemofiltration or haemodiafiltration process utilizes hollow-fibre membranes having relatively large pores and/or high flowrates for the two streams of liquid—blood and dialysate—part of the filtration will proceed convectively.

When, by contrast, the blood treatment takes the form of a simple dialysis, membranes having smaller pores are used and the mass transfer is diffusive. Under these conditions it is particularly low molecular weight substances which permeate, examples being urea, electrolytes, creatinine and phosphate.

Yet the removal of harmful types of plasma proteins from the blood of renally insufficient patients is only achievable in therapeutic processes where a convective type of mass transfer is made possible. Plasma proteins of this type occur in the so-called middle-molecular range. Familiar proteins in the middle-molecular range are β-2 microglobulin or interleukin-6.

The degree to which the harmful metabolites are removed by hollow-fibre membranes in blood cleansing is referred to as clearance. Procedures for determining the clearance of hollow-fibre membranes are known in the prior art. The DIN/EN/ISO 8637:2014 standard for instance describes a standardized method of quantifying clearance.

In the manufacture of hollow-fibre membranes it is the specification, more particularly the specification regarding clearance, yet more particularly the specification of the diffusive clearance of a hollow-fibre membrane which is important in order to be able to monitor the manufacturing process.

The prior art discloses a method of determining a permeation-related property of hollow-fibre membranes which is described in WO 2013/034611. WO 2013/034611 A1 at page 18 describes a method of determining the hydraulic permeability on a hollow-fibre membrane bundle.

PROBLEM ADDRESSED BY THE INVENTION

It has transpired that existing methods of quality control in the manufacture of hollow-fibre membranes are in need of improvement. The present invention accordingly has for its object to provide a simplified method of determining a permeation property, particularly the clearance, further particularly the diffusive clearance of hollow-fibre membranes.

The invention further has for its object to provide an apparatus for testing hollow-fibre membrane bundles to determine the diffusive clearance of the hollow-fibre membranes.

The invention further has for its object, in addition, to provide a method of producing hollow-fibre membranes whereby hollow-fibre membranes are obtainable within a manufacturing process so as to enable compliance with a value range defined before production for the hollow-fibre membranes to be produced in respect of at least one permeation property, more particularly the clearance, yet more particularly the diffusive clearance.

DEFINITIONS AND SUMMARY OF THE INVENTION

In a first aspect of the invention, it was found that, surprisingly, the stated problems of determining a permeation property are solved by providing a method as described herein along with the preferred embodiments of the invention according to the first aspect.

It was further found, in a second aspect of the invention, that the problems described are solved by an apparatus as described herein.

In a further aspect, the invention provides a method of producing hollow-fibre membrane filter modules as described herein by a method as described herein.

The term "permeation property" of a membrane herein refers to that characteristic of a transmembrane type mass transfer which relates to a permeation of matter through a membrane wall. A permeation property of a membrane provides information about the pore structure of the membrane and is taken as a metric capable of characterizing the membrane as regards its porous structure. Any permeation observed as a result of the transmembrane type mass transfer is generally considered in relation to further quantities. More particularly, the term is herein also to be understood as meaning how much of a substance can be separated off from a liquid per unit time by permeation. Based on the starting concentration of the substance, this permeation value indicates the clearance. For the purposes of the present invention, the clearance is taken as a permeation property descriptive of the membrane.

To produce hollow-fibre membrane filter modules, the prior art procedures have hollow-fibre membrane bundles being impressed into a housing of the filter module and terminally potted with a casting resin in the housing. The terminal interspace between the fibres is filled with the casting resin in the process so that terminally no liquid can penetrate through the interspace between the fibres. Initially, the lumens of the hollow-fibre membranes are also closed at the ends. The lumens of the hollow-fibre membranes are bared again by terminally separating off a part of the potted encapsulation. To determine a permeation property, more particularly the ultrafiltration coefficient by the method of the invention there is no need to terminally encapsulate the hollow-fibre membrane bundle and to build the hollow-fibre membrane filter module. In the context of the invention, the hollow-fibre membranes merely have to be terminally closed on one side and be introduced into a housing in order to be measured. Embedding the hollow-fibre membranes in a potting resin, by contrast, is superfluous in the method of the invention.

For the purposes of the invention, the term "impressing" is to be understood as meaning a process wherein a hollow-fibre membrane bundle is introduced into a housing. A hollow-fibre membrane bundle is deformable and as such can be introduced into the housing while being compressed, so the bundle in the interior of the housing is under tension and exerts a force on the inner surface of the housing. Accordingly, the term "introducing" can also be understood as meaning a process wherein a compressed hollow-fibre membrane bundle is introduced into a housing such that the hollow-fibre membrane bundle is caused by its tension to expand and in effect fill out the entire inner space of the housing with hollow-fibre membranes. For the purposes of the present invention, the introducing of a hollow-fibre membrane bundle into a housing while the hollow-fibre membrane bundle is under tension due to compression, so the hollow-fibre membranes will substantially fill out the space of the housing is also referred to as an "impressing" of the hollow-fibre membrane bundle into the housing.

The act of combining a multiplicity of hollow-fibre membranes into a hollow-fibre membrane bundle results in a package of hollow-fibre membranes wherein the hollow-fibre membranes are packed together at a packing density predetermined by the package. Hollow-fibre membrane bundles develop a resistive force in such packing as a hollow-fibre membrane bundle. As a result, a hollow-fibre membrane bundle is compressible and offers a restoring force in response to compression. Compressed hollow-fibre membrane bundles want to return to a relaxed state. The restoring force is more particularly also connected with a wave pattern embossed on the hollow-fibre membranes in the course of their formation. Corresponding methods of forming hollow-fibre membranes and hollow-fibre membrane bundles are known from the prior art, for example from DE 100 07 327 A1.

For the purposes of the present invention, the term "test liquid" is to be understood as meaning a liquid with which a membrane can be tested as regards a permeation property. Such test liquids may be, for example, aqueous solutions or pure water, but more particularly also blood plasma or blood. The test liquid or at least a part of it is membrane permeant. The term "membrane permeant" herein is to be understood as meaning that the test liquid or a part thereof is able to permeate from the lumen of the hollow-fibre membrane through the membrane wall and into the outer surroundings of the hollow-fibre membrane.

For the purposes of the present invention, the term "test substance" is to be understood as meaning a substance which is a constituent part of a test liquid. More particularly, test substances may constitute dissolved constituents of a test liquid, for example salts or water-soluble compounds.

DETAILED DESCRIPTION OF THE INVENTION

It was found in a first aspect of the invention that, surprisingly, the aforementioned problem is solved by a novel method of determining a permeation property of hollow-fibre membranes.

The method of determining at least one permeation property, more particularly the clearance of hollow-fibre membranes in the manner of the invention comprises the steps of:
  (a) providing a hollow-fibre membrane bundle comprising a multiplicity of hollow-fibre membranes having a first end and a second end, wherein the lumens of the hollow-fibre membranes at the first end of the hollow-fibre membrane bundle are terminally open, more particularly liquid-permeable and at the second end of the hollow-fibre membrane bundle are terminally closed, more particularly liquid-tight,
  (b) providing a housing for receiving the hollow-fibre membrane bundle having a first end and a second end, wherein the first end has at least one liquid inlet,
  (c) introducing the hollow-fibre bundle into the housing while the first end of the hollow-fibre bundle having the terminally open lumen of the hollow-fibre membranes is oriented towards the at least one liquid inlet at the first end of the housing,
  (d) determining a permeation property of the hollow-fibre membranes.

It transpired that the method steps specified make it possible to determine permeation properties of hollow-fibre membranes without first having to form hollow-fibre membrane filter modules from the hollow-fibre membrane bundles. There is accordingly no need for the burdensome formation of test filter modules. The permeation property of the hollow-fibre membrane is determined without first potting the hollow-fibre membrane bundle.

In one embodiment, the method of the invention comprises the steps of:
  (a) providing a hollow-fibre membrane bundle comprising a multiplicity of hollow-fibre membranes having a first end and a second end, wherein the openings of the lumens of the hollow-fibre membranes at the first end of the hollow-fibre membrane bundle are terminally open, more particularly liquid-tight and at the second end of the hollow-fibre membrane bundle are terminally closed, more particularly liquid-tight,
  (b) providing a housing for receiving the hollow-fibre membrane bundle having a first end and a second end, wherein the first end of the housing has at least one liquid inlet, and the second end of the housing has at least one liquid outlet,
  (c) introducing the hollow-fibre membrane bundle into the housing while the first end of the hollow-fibre membrane bundle having the terminally open lumens of the hollow-fibre membranes is oriented towards the at least one liquid inlet and the second end of the hollow-fibre membrane bundle having the terminally closed lumens of the hollow-fibre membranes is oriented towards the at least one liquid outlet,
  (d) providing a first test liquid and a second test liquid, wherein at least the first or the second test liquid includes at least one test substance and the second test liquid differs from the first test liquid, more particularly at least in the concentration of the at least one test substance,
  (e) filling the housing and/or the hollow-fibre membrane bundle by routing the first test liquid through the at least one liquid inlet at the first end of the housing into the interior of the housing and/or of the hollow-fibre membrane bundle,
  (f) inflowing a second test liquid through at least one liquid inlet at the first end of the housing into the interior of the housing and/or of the hollow-fibre membrane bundle/hollow-fibre membranes,
  (g) measuring the concentration of the at least one test substance, at one or more than one liquid outlet of the housing, while the second test liquid flows into the housing and/or the hollow-fibre membrane bundle through at least one liquid inlet.

The method of the invention has the advantage that the clearance, more particularly the diffusive clearance, of hollow-fibre membranes can be determined in a rapid and reliable manner. This has the advantage, particularly in processes for production of hollow-fibre membranes, of being able to control the production process promptly by reference to the clearance values obtained. Any significant faulty production is avoidable as a result.

In a further embodiment, the method of the invention consists of the following steps:
  (a) providing a hollow-fibre membrane bundle comprising a multiplicity of hollow-fibre membranes having a first end and a second end, wherein the openings of the lumens of the hollow-fibre membranes at the first end of the hollow-fibre membrane bundle are terminally open, more particularly liquid-permeable and at the second end of the hollow-fibre membrane bundle are terminally closed, more particularly liquid-tight,
  (b) providing a housing for receiving the hollow-fibre membrane bundle having a first end and a second end, wherein the first end of the housing has at least one liquid inlet, and the second end of the housing has at least one liquid outlet, (c) introducing the hollow-fibre membrane bundle into the housing while the first end of the hollow-fibre membrane bundle having the terminally open lumens of the hollow-fibre membranes is oriented towards the at least one liquid inlet and the second end of the hollow-fibre membrane bundle having the terminally closed lumens of the hollow-fibre membranes is oriented towards the at least one liquid outlet, (d) providing a first test liquid and a second test liquid, wherein at least the first or the second test liquid includes a test substance and the second test liquid differs from the first test liquid, more particularly at least in the concentration of the at least one test substance, (e) filling the housing and/or the hollow-fibre membrane bundle by routing the first test liquid through the at least one liquid inlet at the first end of the housing into the interior of the housing and/or of the hollow-fibre membrane bundle/hollow-fibre membranes, (f) inflowing a second test liquid through at least one liquid inlet at the first end of the housing into the interior of the housing and/or of the hollow-fibre membrane bundle, (g) measuring the concentration of the at least one test substance, at one or more than one liquid outlet of the housing, while the second test liquid flows into the housing and/or the hollow-fibre membrane bundle through at least one liquid inlet.

A first step of the method according to the invention comprises providing a hollow-fibre membrane bundle comprising a multiplicity of hollow-fibre membranes having a first end and a second end, wherein the openings of the lumens of the hollow-fibre membranes at the first end of the hollow-fibre membrane bundle are terminally open, more particularly liquid-permeable, and at the second end of the hollow-fibre membrane bundle are terminally closed, more particularly liquid-tight.

The term "hollow-fibre membrane bundle" herein is to be understood as meaning a bundle formed from a multiplicity of hollow-fibre membranes. A "hollow-fibre membrane" has a capillary structure. More particularly, the hollow-fibre membrane is a membrane in the shape of hollow filaments which consist of a porous material and has an essentially circular diameter. The wall thicknesses of such hollow-fibre membranes as may be provided for dialysis may be in the range from 10 to 100 µm, depending on membrane material. Lumen diameters with hollow-fibre membranes of this type are commonly between 150 µm to 250 µm, in particular between 180 µm and 220 µm, while fibre length is in the range from 150 µm to 300 mm, in particular between 250 mm and 300 mm. Liquids are able to flush through the hollow interior of hollow-fibre membranes. Hollow-fibre membranes are more particularly provided for separation processes reliant on a transmembrane permeation of matter from the outside surface to the hollow interior, or from the hollow interior to the outside surface, of the hollow-fibre membrane. Hollow-fibre membranes of this type are typically employed in the therapeutic treatment of blood.

The material of a hollow-fibre membrane may be selected from polymers, preferably from polysulphone, polyether sulphone, polyvinylpyrrolidone, polypropylene, polyacrylonitrile, polyamide, polyethylene ether, cellulose, cellulosic regenerate, cellulose acetate or mixtures thereof. Particular preference is given to hollow-fibre membranes comprising, more particularly consisting of, a hydrophobic polymeric material, e.g. polysulphone or polyether sulphone, and a hydrophilic polymeric material, e.g. polyvinylpyrrolidone.

The hollow-fibre membrane has a multiplicity of pores designed to enable mass transfer between the interior of the hollow-fibre membrane and the surroundings of the hollow-fibre membrane. "Lumen" is the name given to the hollow interior of a hollow-fibre membrane. The hollow-fibre membrane bundle employed in the context of the present invention is unpotted, i.e. the ends of the hollow-fibre membrane bundle are not embedded in a plastics matrix.

For the purposes of the present invention, the term "lumen" is to be understood as meaning a coherent cavity extending in the interior of the hollow-fibre membrane along the length. The lumen of hollow-fibre membranes is surrounded by the porous membrane wall, so liquids routed through the interior of the lumen are in mass-transfer contact with the membrane wall along the hollow-fibre membrane and a transmembrane passage of matter is observable. The openings to the lumens at the fibre ends constitute access points where fluids, more particularly liquids, are able to flow through the fibre interior. The lumens are terminally closable by, for example, the application of heat; more particularly, the lumens are closable in such a way that a particular end of the hollow-fibre membrane is fluid-, more particularly liquid-tight.

The act of combining a plurality of hollow-fibre membranes into a hollow-fibre membrane bundle leads to the creation, between the individual hollow-fibre membranes, of interspaces likewise capable of ducting liquids and/or gases. A hollow-fibre membrane bundle preferably numbers at least 50 to 20 000 hollow-fibre membranes. Typical diameters of hollow-fibre membrane bundles are in the range from 15 mm to 50 mm. The hollow-fibre membrane bundle employed in the method of the invention is unpotted, i.e. the ends of the hollow-fibre membrane bundle are not potted in a casting resin.

The hollow-fibre membrane bundle has a first end and a second end, the first end differing from the second end. The first end of the hollow-fibre membrane bundle has open hollow-fibre membranes. More particularly, the openings of the lumens of the hollow-fibre membranes at the first end of the hollow-fibre membrane bundle are terminally open. As a result, liquids and/or gas are able to exit from the lumen into the surroundings or enter the lumen from the surroundings.

The determination of a permeation property by the method of the invention proceeds from a hollow-fibre membrane bundle consisting of a multiplicity of hollow-fibre membranes whose permeation properties, more particularly the clearance are to be quantified. Hollow-fibre membrane bundles are obtained from the prior art manufacturing processes and further used for the manufacture of hollow-fibre membrane filter modules. In a first step of the method, the openings of the lumens of the hollow-fibre membranes in the hollow-fibre membrane bundle are closed at one end. Procedures for closing the hollow-fibre membranes at one end of the hollow-fibre membrane bundle are known in the prior art. The hollow fibres are closable by application of heat, for example via heat radiation or heat contact, by filling with waxes or plastics, or via laser radiation. A method involving heat contact against an aluminium foil is preferable in the present invention. Closed in this context is to be understood as meaning that the fibre ends are liquid-tight, so liquid cannot enter or exit the lumen of the fibre via the fibre end.

The hollow-fibre membrane bundle having hollow-fibre membranes terminally closed at the second end and hollow-fibre membranes terminally open at the first end is then impressed into an elongate, preferably vertically upright housing. The term "housing" herein is to be understood as meaning a hollow body provided for receiving a multiplicity of hollow-fibre membranes. When a hollow-fibre membrane bundle consisting of a multiplicity of hollow-fibre membranes is introduced into a housing, this leaves a space in the housing, between the hollow-fibre membranes and between the housing's inner wall and the outside surface of the hollow-fibre membranes, wherethrough liquids are able to flow. Suitable housings may have an elongated shape, so one dimension of a housing is longer than the second and third dimensions and hence is termable the longitudinal axis of the housing. In accordance with the longitudinal shape of the provided housing, it is usable in preferred orientations, vertically and horizontally.

In one preferred shape, such a housing is cylindrical, for example in sleeve form. Corresponding sleeve-shaped housings may be open at one end at least, so a hollow-fibre membrane bundle is introducible into the sleeve. The housing is subsequently closable or combinable with corresponding end-caps or connectors. Corresponding sleeves useful as housings for hollow-fibre membrane bundles are known in the prior art from the construction of dialyzers. Corresponding housings preferably consist of a flexurally stiff plastics material, e.g. polycarbonate, polypropylene or polyoxymethylene, or of metals, e.g. aluminium or stainless steel.

The packing density of the hollow-fibre membrane bundle impressed into the housing is preferably in the range from 20 to 80% and more preferably in the range from 50 to less than 65%. The elongate housing has a first end and a second end and the housing further has a liquid inlet at the first end and a liquid outlet at the second end. The arrangement of the hollow-fibre membrane bundle in the housing is such that the terminally open hollow-fibre membranes are oriented towards the liquid inlet while the terminally closed hollow-fibre membranes are oriented towards the liquid outlet.

A further step comprises providing a first test liquid and a second test liquid, of which at least the first test liquid contains a test substance. The housing is filled with the first test liquid. Filling is effected by any air being displaced from the pores of the hollow-fibre membrane, the space between the hollow-fibre membranes and the lumen of the hollow-fibre membrane and flushed out of the housing. The first test liquid washes all over the hollow-fibre membrane bundle during the filling step, so the hollow-fibre membrane bundle is completely surrounded by the first test liquid.

Due to the housing being full, an excess of the first test liquid is envisaged to overflow at the liquid outlet of the housing. The volume rate of the inflowing test liquid is preferably set such that the volume of the housing with the hollow-fibre membrane bundle present therein is exchanged once between 30 seconds and 5 minutes. It is more particularly envisaged to let the test liquid inflow at a volume rate of 20 to 150 ml/min.

The inflow of the first test liquid is then terminated and the inflow of a second test liquid is commenced. The second test liquid differs from the first test liquid at least in the concentration of the test substance. The second test liquid preferably consists of distilled water. During the inflow of the second test liquid, the concentration of the test substance at the liquid outlet of the housing is measured using suitable measuring means. The measuring means may be detectors which deliver a concentration-dependent signal with regard to the test substance. Detectors of this type may be, for example, conductivity detectors or photometric detectors. Further detectors are well known in the prior art.

Since the second test liquid contains the test substance in some other concentration or not at all, the concentration measured for the test substance in the outflowing liquid at the liquid outlet of the housing will generally differ from the concentration of the test substance in the first test liquid. Preferably, the test substance is present in the second test liquid in a lower concentration than in the first test liquid or not at all, so the concentration observable at the liquid outlet of the housing will indicate a lower concentration with increasing inflow time for the second liquid.

The latter case gives rise to an observable decreasing concentration of test substance at the liquid outlet since, for one, the interspace volume of the hollow-fibre membranes is washed clear of the test liquid by the inflowing further liquid. This produces a concentration gradient for the test substance between the hollow-fibre interspace on one side and the pore space and the lumen side of the hollow-fibre membranes on the other side. Over time, the test substance will permeate through the membrane wall in accordance with the concentration gradient (in order to smooth out said concentration gradient) and will be flushed by the stream of the second test liquid towards the liquid outlet.

It transpires that the concentration as quantified by the measuring means, more particularly the quantified trajectory for the concentration of the test substance at the liquid outlet, is characteristic of the permeation behaviour of the tested hollow-fibre membrane in the hollow-fibre membrane bundle. It is therefore possible, for example from the way the permeation properties of hollow-fibre membranes change during a manufacturing process for hollow-fibre membranes, to make deductions about the quality of the manufacturing process and/or of the hollow-fibre membranes obtained.

To determine the permeation behaviour of a hollow-fibre membrane taken from the hollow-fibre membrane production line, the method of the invention does not, as hitherto customary, require individual test filter modules to be fabricated from hollow-fibre membrane bundles formed from hollow-fibre membranes taken off the production line. There is accordingly no need for the burdensome preparation of test filter modules. For the purposes of the invention, the hollow-fibre membrane bundle to be tested merely has to be one-sidedly closed, obviating all the further steps needed to prepare a ready-to-use test filter module.

In this context, test filter module is to be understood as referring to a filter module which resembles a construction of dialyzers, but is exclusively used for determining the permeation properties of the manufactured hollow-fibre membrane bundles, and is subsequently disposed of. To prepare test filter modules, all the usual steps of making a filter have to be carried out. That is, the hollow-fibre membrane bundles are impressed into the housing of the test filter modules and are terminally potted with a casting resin in the housing, and this is disadvantageous.

A further effect of the invention according to the first aspect resides in the fact that the hollow-fibre membranes are testable for their permeation property within a short time, i.e. within a few minutes of having been formed. Prior art test procedures, for which it is necessary to build complete test filter modules, take a period of at least 3 hours. The large amount of scrap which can be produced during this period is avoidable by using the method of the invention.

It was found, in one embodiment of the first aspect of the invention, that suitable evaluation of the measured results obtained makes it possible to determine the clearance, more particularly the diffusive clearance by means of a test substance. The clearance, more particularly the diffusive clearance is considered to be a characteristic permeation property of a hollow-fibre membrane. In the manufacture of hollow-fibre membranes, the quantified clearance and the quantified diffusive clearance accordingly also serve as a measure of whether the manufacturing process is running in accordance with mandated process parameters, or whether the manufacturing process is perhaps imperceptibly breaching the mandate of the process parameters.

To determine the clearance, more particularly the diffusive clearance, the concentration of the test substance is, as described above, repeatedly or continuously measured at one or more than one liquid outlet of the housing during the inflow of the second test liquid into the housing as a function of time. The measured values obtained or the measured-value trajectory are used to record a concentration trajectory for the test substance at the liquid outlet. Preferably, the second test liquid either includes no test substance or includes the test substance in a lower concentration than the first test liquid, so the recorded trajectory of the concentration represents a decreasing concentration of the test substance over time. It was found that, surprisingly, the clearance, more particularly the diffusive clearance is quantifiable via a characteristic curve parameter of the recorded trajectory of concentration.

To quantify the characteristic curve parameter, one step comprises fitting a mathematical function to at least a portion of the curve of the quantified trajectory of concentration. Useful mathematical functions include, for example, known fitting functions.

In the simplest case, a straight line is fittable to a nearly linear portion of the quantified trajectory of concentration. Other suitable fitting functions may constitute exponential or sigmoidal functions.

A further step comprises determining at least one characteristic parameter of the mathematical function fitted. This can be, for example, the slope in an examined portion of the concentration trajectory of the mathematical function.

It was further found, in an embodiment of the first aspect of the invention, that the quantified characteristic parameter can be used to determine a second parameter to directly represent the permeation property, or to be more precise the clearance, more particularly the diffusive clearance.

To this end, the calibration values previously quantified were used to assign the quantified characteristic value of the curve parameter a certain value for the clearance, more particularly the diffusive clearance. The previously determined calibration values may be in the form of tables and the clearance, more particularly the diffusive clearance, is determinable from the characteristic parameter of the mathematical function fitted. The previously quantified calibration values may be used for example to establish a calibration function or a calibration curve to enable the first parameter, which describes the mathematical fitting function, to be related to the clearance, more particularly the diffusive clearance.

The calibration curve is preferably established using hollow-fibre membranes whose clearance value was determined using known procedures. The clearance is determinable for example on test filter modules containing the potted hollow-fibre membrane bundles of the hollow-fibre membrane to be tested by the procedure referred to in the DIN/EN/ISO standard 8637:2014. Identical hollow-fibre membrane bundles are then measured using the method of the invention. The concentration trajectory quantified for the test substance is used for example to quantify a characteristic slope value which is correlated with the already known clearance value of the test filter modules. A plurality of such evaluations and correlations are carried out on hollow-fibre bundles differing in pore constitution for the hollow-fibre membranes. A plurality of these correlations is subsequently used to establish a calibration curve. It was ascertained that a curve trajectory of unambiguous correlation can be established between the known clearance values and the evaluated curve parameter values.

It was found, in a further embodiment of the invention according to the first aspect, that the evaluation and hence the accuracy of the clearance quantified according to the invention, more particularly the diffusive clearance, can be improved by fitting appropriate curve-fitting functions as a mathematical function to the quantified decreasing trajectory for the concentration of the test substance.

In cases where the decreasing trajectory in the concentration of a test substance is largely linear in portions, Equation 1 is useful as a mathematical function for a rapid evaluation.

$$Y = A_1 - A_2 \cdot t \qquad \text{Eq. 1}$$

$A_1$ relates to the intercept of a straight line according to Equation 1

$A_2$ relates to the slope of the straight line.

In an alternative use, it may be advantageous to fit the decreasing trajectory in the concentration of a test substance in the method of the invention with a mathematical exponential function according to Equation 2:

$$Y = B_1 \cdot e^{-B_2 \cdot t} \qquad \text{Eq. 2}$$

In a further alternative use, it may be advantageous to fit the decreasing trajectory in the concentration of a test substance in the method of the invention with a mathematical sigmoidal function according to Equation 3:

$$Y = \frac{C_1}{1 + e^{C_3 \cdot (t - C_2)}} \qquad \text{Eq. 3}$$

$C_1$ relates to the starting point of the curve
$C_2$ indicates the X-axis portion to the point of inflection
$C_3$ determines the slope at the point of inflection To evaluate the concentration trajectory according to any of Equations 1 to 3 in the method of the invention, the corresponding calibration curves also have to be evaluated in the same way according to any of Equations 1 to 3. The characteristic curve parameter enlisted to evaluate a hollow-fibre membrane bundle of unknown clearance value is the same as also used in the determination of the corresponding calibration curve.

It transpired in a further embodiment of the first aspect of the invention that to determine the clearance value it is particularly the slope at a point of a mathematical function, for example the inflection point of a sigmoidal mathematical function fitted to the decreasing trajectory for the concentration of the test substance which is advantageous for the evaluation.

The test substance of the test liquid is advantageously a substance whose concentration in the outflowing liquid is readily detectable and which is able to represent the permeation properties tested. It is more particularly sodium, creatinine, phosphate or vitamin B12 which has proved advantageous for determining the diffusive clearance of hollow-fibre membranes. These substances are particularly preferable because they are of low molecular weight and therefore are representative of the diffusive type of mass transfer by virtue of their intrinsic molecular motion.

In a further embodiment according to the first aspect of the invention, the concentration of the test substances in the test liquid is chosen so as to ensure good detectability. A further embodiment according to the first aspect of the invention provides that NaCl be used as test substance in concentrations of 30 to 100 g/l, more preferably 70 to 90 g/l in order to be able to ascertain reproducible test results by conductivity measurement at the liquid outlet of the housing of the measuring apparatus.

It further transpires that vitamin B12 is very useful as test substance, since vitamin B12 has very good photometric detectability. Owing to its higher molecular weight as compared with NaCl, some information as to the pore size distribution of the hollow-fibre membranes tested is additionally obtainable. A further embodiment according to the first aspect of the invention therefore uses vitamin B12 as test substance in concentrations of 100 to 3000 mg/l, preferably 200 to 2000 mg/l, preferably 400 to 600 mg/l.

The volume rate of the inflowing second test liquid may be of importance for the method of the invention depending on the type of hollow-fibre membranes.

Depending on the pore constitution of the hollow-fibre membranes, it is advantageous to minimize the convective type of mass transfer through the membrane to determine the diffusive clearance. It was accordingly found, in a further embodiment according to the first aspect of the invention, that accuracy is ensured for the measurement when the volume rate at the liquid exit of the testing apparatus is in the range from 10 to 120 ml/min, preferably from 40 to 100 ml/min, preferably from 60 to 80 ml/min.

The transmembrane pressure difference is further also affected by the packing density of the hollow-fibre membranes in the housing of the measuring apparatus under flow conditions. In a further embodiment according to the first aspect of the invention, hollow-fibre membrane bundles numbering from 50 to 20 000 hollow-fibre membranes are successfully testable provided the packing density in the housing of the testing apparatus is in the range from 20 to 80%. It was found that at a packing density below 80% there was no significant transmembrane pressure difference in the flow state of the test method. The convective type of mass transfer across the membrane wall is thereby also avoided or reduced, which is important for determining the diffusive clearance in particular.

In a second aspect, the invention provides an apparatus for carrying out the method according to at least one embodiment of the first aspect of the invention.

The apparatus accordingly consists of
- at least one reservoir for receiving at least one liquid, more particularly the first test liquid and/or the second test liquid,
- a measurement apparatus comprising a housing having a first end and a second end for receiving a hollow-fibre membrane bundle, wherein the first end of the housing has at least one liquid inlet and the second end of the housing has at least one liquid outlet,
- at least one communication apparatus, more particularly pumping means and liquid communications for inflowing at least a first test liquid and/or at least a second test liquid from the at least one reservoir into the housing through the at least one liquid inlet on the first end of the housing,
- a detector for detecting the concentration of the at least one test substance at at least one liquid outlet at the second end of the housing.

In a third aspect, the invention relates to the use of an apparatus according to the second aspect of the invention for carrying out a method according to the first aspect of the invention.

In a fourth aspect, the invention relates to the production of hollow-fibre membrane filter modules wherein the method according to the first aspect of the invention is used to produce hollow-fibre membranes having a predetermined permeation property.

The method comprises the steps of:
(a) defining at least one value range for at least one or more permeation properties of hollow-fibre membranes intended for the production of hollow-fibre membrane filter modules,
(b) selecting one or more manufacturing parameters to produce hollow-fibre membranes having the at least one or more permeation properties of the value range(s) defined in step (a),
(c) producing hollow-fibre membranes by a spinning process according to the one or more manufacturing parameters selected in step (b),
(d) bundling the hollow-fibre membranes obtained into hollow-fibre membrane bundles,
(e) carrying out a method of determining one or more permeation properties, more particularly the clearance of the hollow-fibre membranes according to an embodiment of the first aspect of the invention,
(f) using the hollow-fibre membrane bundles for the construction of filter modules once it has been ascertained that the one or more permeation properties fall within the at least one value range defined in step (a).

A first step of the production method comprises defining a permeation property value range for the production of hollow-fibre membranes. Value ranges of this type may be, for example, a certain range for the clearance of a certain test substance, for example NaCl. The value range is defined in advance in order to precisely produce hollow-fibre membranes useful, for example by virtue of their diffusive NaCl clearance, for certain therapeutic methods in dialysis.

A further step comprises using the value range to be achieved for the permeation property to determine at least one manufacturing parameter, but more particularly a multiplicity of manufacturing parameters, in order that corresponding hollow-fibre membranes may be produced. The manufacturing parameters concern parameters having an effect on the spinning process to produce the hollow-fibre membrane. Manufacturing parameters include, for example, the composition of the spinning solution, the composition of the internal coagulant, the temperature of the annular die wherethrough the spinning solution is extruded, the extrusion speed, or the magnitude of the air gap. The multiplicity of manufacturing parameters having an effect on the permeability property of hollow-fibre membranes is described in the prior art. The hollow-fibre membranes subsequently produced according to the mandated manufacturing parameters and by a spinning process are then bundled and provided in the form of hollow-fibre membrane bundles for the further production of hollow-fibre membrane filter modules.

A representative number of these hollow-fibre membrane bundles is subsequently tested using the method which the invention provides to determine one or more permeation properties according to an embodiment of the first aspect of the invention. This makes it possible to ascertain whether the one or more permeation properties fall within the value range previously defined. It is more particularly possible to ascertain in this way whether the produced hollow-fibre membranes of the particular hollow-fibre membrane bundles do or do not fall within the previously defined value range as regards, for example, the clearance.

Since the method according to the first aspect of the invention provides a quick way to determine a permeability property of the hollow-fibre membranes produced, said method of the invention can be used to effect prompt control of the production process. More particularly, the hollow-fibre membranes produced can be tested for compliance with the previously defined clearance value range, for example, to see whether the hollow-fibre membranes can thereby be approved for use in the construction of hollow-fibre membrane filter modules.

Where the manufacturing process fails to maintain the properties of the manufactured hollow-fibre membranes within the previously defined value range or only just within, appropriate deductions can be made regarding the manufacturing parameters. The manufacturing parameters can subsequently be adjusted such that the properties of the hollow-fibre membranes obtained are in compliance with the value ranges defined. The manufacturing process thus regulated reiterates steps (a) to (d) until it is possible to decide that the hollow-fibre membranes produced are usable for the construction of hollow-fibre membrane filter modules.

The abovementioned method of production is very useful for the manufacture of hollow-fibre membranes produced on the basis of the membrane materials polysulphone and polyvinylpyrrolidone. The spinning solutions used for forming such hollow-fibre membranes contain polysulphone (PSU) and polyvinylpyrrolidone (PVP) typically dissolved in polar aprotic solvents. Examples of suitable solvents include N-methylpyrrolidone, dimethyl sulphoxide and dimethylacetamide. It has been determined that batches of polysulphone/polyvinylpyrrolidone spinning solutions make it particularly difficult to maintain the permeation properties, more particularly the diffusive clearance, of product hollow-fibre membranes in a precise manner, since these respond in a very sensitive manner to variations in production parameters. The present production method of the invention has been determined to be particularly advantageous for forming PSU/PVP hollow-fibre membranes because it allows deviations caused by a change in the production parameters to be detected within a very short time and for the manufacturing process to be adjusted accordingly.

DESCRIPTION OF THE INVENTION BY MEANS OF EXAMPLES

Figure 1:
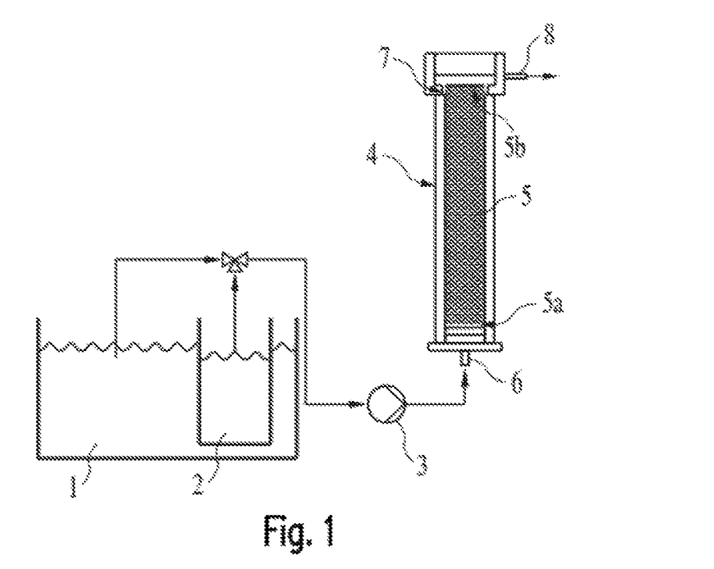

Example 1—Apparatus for Determining a Permeation Property of Hollow-Fibre Membranes FIG. 1 shows an apparatus for determining a permeation property of hollow-fibre membranes on a hollow-fibre membrane bundle.

The depicted apparatus consists of a reservoir of distilled water (1) temperature regulated to 25° C. by a thermostat. The water bath holds a further receptacle (2), containing a first test liquid. The test liquid is an aqueous solution of the test substances NaCl at 90 g/l concentration and vitamin B12 at 500 mg/l concentration. A pump (3) can be used to transport selectively the water or the first test liquid. The pumped stream leads to a closure sealed off using an O-ring and put on the bottom end of a sleeve-shaped housing (4). The housing (4) in this case has the shape of a sleeve whereinto the hollow-fibre membrane bundle (5) has been introduced. The closure has a centrally drilled hole of 4 mm wherethrough the liquid penetrates into the sleeve and which serves as liquid inlet (6).

A hollow-fibre membrane bundle is impressed into the sleeve in accordance with the method of the invention. The sleeve in the present embodiment has an overall length of 330 mm and is open at its top end. In the present embodiment of FIG. 1, this top end, in having an internal diameter of 54 mm, is somewhat broader than the rest of the sleeve, where the internal diameter is 34 mm. The hollow-fibre membrane bundle itself is situated in this narrower region and ends at the upper edge thereof. An annulus (7) about 1 mm in width and 10 mm in height was milled out of the sleeve in the present embodiment in order to obtain a drain for the test liquid. At a point about 2 mm thereabove is the liquid outlet (8) for sample taking.

Example 2—Method to Determine a Permeation Property of Hollow-Fibre Membranes To prepare the first test liquid, 90 g of sodium chloride and 500 mg of vitamin B12 are dissolved in about 500 ml of distilled water under constant agitation and the solution is made up to 1 litre with distilled water and temperature regulated to 25° C. in a water bath.

The hollow-fibre membrane bundle to be tested is melted shut on one side ($5b$) using an aluminium foil on a hotplate at about 300° C. After the bundle has cooled down, the aluminium foil is peeled off and the bundle is impressed into the sleeve-shaped housing (4) as shown in FIG. 1. The peristaltic pump is set at a flowrate of 70 ml/min, and the housing (4) is initially filled with the first test liquid. The open end ($5a$) of the hollow-fibre membrane bundle (5) is adjacent to the drilled hole (6).

Because the membrane is air permeable as long as it is still dry, care is taken to ensure that not just the interspace of the hollow-fibre membranes, but also the lumen side and the pore volume of the hollow-fibre membranes is filled with the first test liquid completely and without air bubbles.

As soon as the concentrate completely covers the closed side of the fibre bundle ($5b$), the peristaltic pump (3) is switched from pumping the first test liquid to pumping the second test liquid. The second test liquid is distilled water. As a result, then, distilled water is flowing through the liquid inlet into the housing. At the outlet stub, commencing with the inflowing of the second test liquid, a 10 ml sample is taken every minute. Alternatively, the concentration measurement may also be done continuously.

The vitamin B12 concentration is determined with a photometer on every sample. The concentration of NaCl in the respective samples may be determined by conductivity measurement.

Example 3—Evaluation of Permeation Properties

Figure 2:
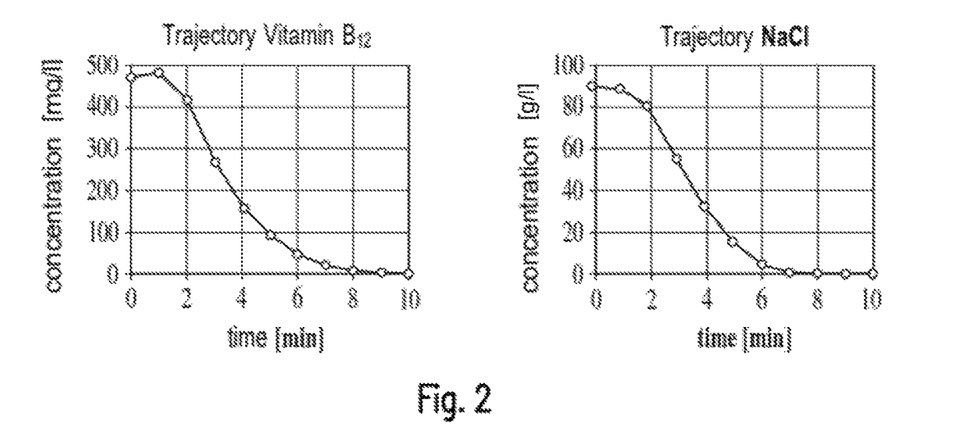

The concentrations quantified in Example 2 for the particular samples are plotted against the time as per FIG. 2. In the present example, the concentration trajectory of the test substances NaCl and vitamin B12 at the liquid outlet is fitted by a sigmoid function as per Equation 3:

$$Y = \frac{C_1}{1 + e^{C_3 \cdot (t - C_2)}} \qquad \text{Eq. 3}$$

$C_1$ relates to the starting point of the curve
$C_2$ indicates the X-axis portion to the point of inflection
$C_3$ determines the slope at the point of inflection The sigmoid function is mathematically fitted to the measured values using a software program, for example the Scilab program or the Excel 2010 software program. In the Excel 2010 software program, for example, an add-in called a solver can be used to optimize the parameters $C_1$ to $C_3$ so as to minimize the sum of least squares. By way of optimization strategy, the use of the "GRG nonlinear" solution approach has been determined to lead to good results. The value obtained for $C_3$ in Equation 3 is used with preference for determining the diffusive clearance.

Example 4—Comparison with Conventional Clearance Measurement Using Vitamin B12 Clearance as an Example The following clearance values were quantified for vitamin B12 on commercially available dialyzers using procedures as described in the prior art and more particularly in the DIN/EN ISO 8637 standard:

TABLE 1

| Dialyzer | Clearance value |
| --- | --- |
| Fresenius LX | 140 ml/min |
| Fresenius FX 60 | 160 ml/min |
| Fresenius FX 60 H | 163 ml/min |
| Fresenius FX 60 HC | 175 ml/min |

The dialyzers tested were dialyzers from Fresenius Medical Care.

The hollow-fibre membrane bundles in the dialyzers having the designation listed in Tab. 1 were further tested by the method of the invention. The quantified curve of measurements was fitted with the function of Equation 3. The $C_3$ values obtained from fitting Equation 3 yielded the following results:

TABLE 2

| Hollow-fibre membrane bundle | $C_3$ |
| --- | --- |
| Fresenius LX | 0.815 |
| Fresenius FX 60 | 1.025 |
| Fresenius FX 60 H | 1.055 |
| Fresenius FX 60 HC | 1.113 |

Figure 3:
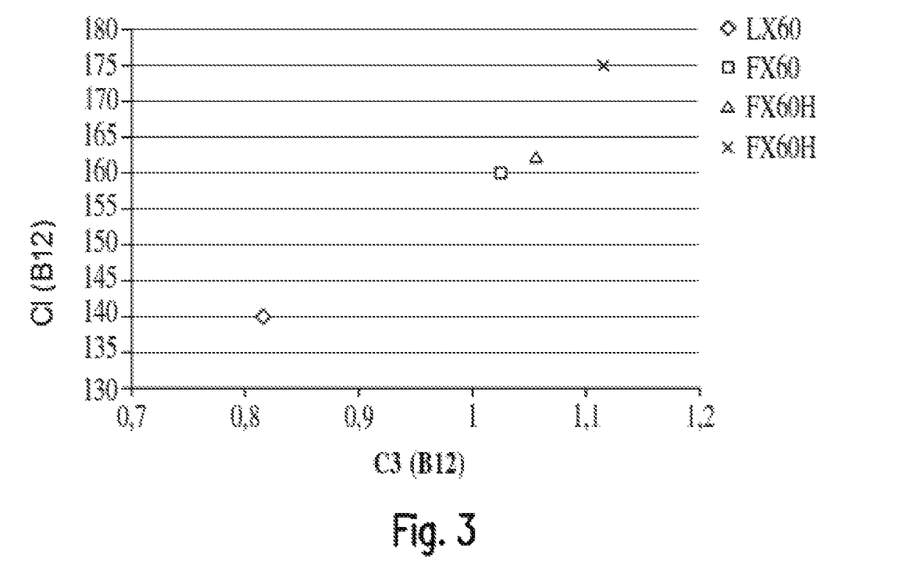

The plot of the clearance values against the quantified $C_3$ values is shown in FIG. 3. The plot shows a high correlation between the vitamin B12 clearance values measured on the dialyzers and the $C_3$ values quantified by the method of the invention. The correlation may in turn be fitted with a suitable mathematical function and thus be used as a calibration curve or function for further tests.

Example 5—Further Possibilities Regarding Evaluation

The measurement curves of four hollow-fibre membrane bundles F1 to F4 for vitamin B12 and sodium chloride are recorded as described in Examples 1 to 4. The clearance values of the hollow-fibre membranes were first quantified on corresponding dialyzers comprising identical hollow-fibre membranes by known procedures, for example by the procedure of the DIN EN ISO 8637 2014 standard:

TABLE 3

| Dialyzer | Clearance Vitamin B12, DIN EN ISO 8634 2014 |
| --- | --- |
| F1 | 140 ml/min |
| F2 | 160 ml/min |

TABLE 3-continued

| Dialyzer | Clearance Vitamin B12, DIN EN ISO 8634 2014 |
| --- | --- |
| F3 | 163 ml/min |
| F4 | 175 ml/min |

The curve trajectory of the concentration trajectory curves over time can then be fitted with various functions. Various parameters are in effect quantified by regression or least squares. This can be done using the Excel 2010 program for example. It transpires that a linear regression may suffice:

$$Y = A_1 - A_2 \cdot t \qquad \text{Eq. 1}$$

In the example, the measured values at between two and 6 minutes were used to carry out a regression. Other datapoints may be selected instead. What is important is that the same procedure be used between establishing the calibration curve and the measured-value determination for an unknown bundle.

It is alternatively possible to use an exponential function of formula according to Equation 2:

$$Y = B_1 \cdot e^{-B_2 \cdot t} \qquad \text{Eq. 2}$$

The formulae of Equations 1 and 2 have the advantage that the coefficients $A_1, A_2, B_1$ and $B_2$ are quantifiable simply by adding the corresponding trend line in the particular software program, e.g. Excel 2010.

A calibration function can then be established for these hollow-fibre membrane bundles by means of the previously quantified clearance values, which were determined in a dialyzer. It transpires that the use of the parameters $A_2$ and $B_2$ is particularly sensible.

To evaluate larger time spans, it can prove sensible to use sigmoidal functions. A sigmoidal function describes an "S" curve and may typically be represented by Equation 3, as shown in Example 4.

Figure 4:
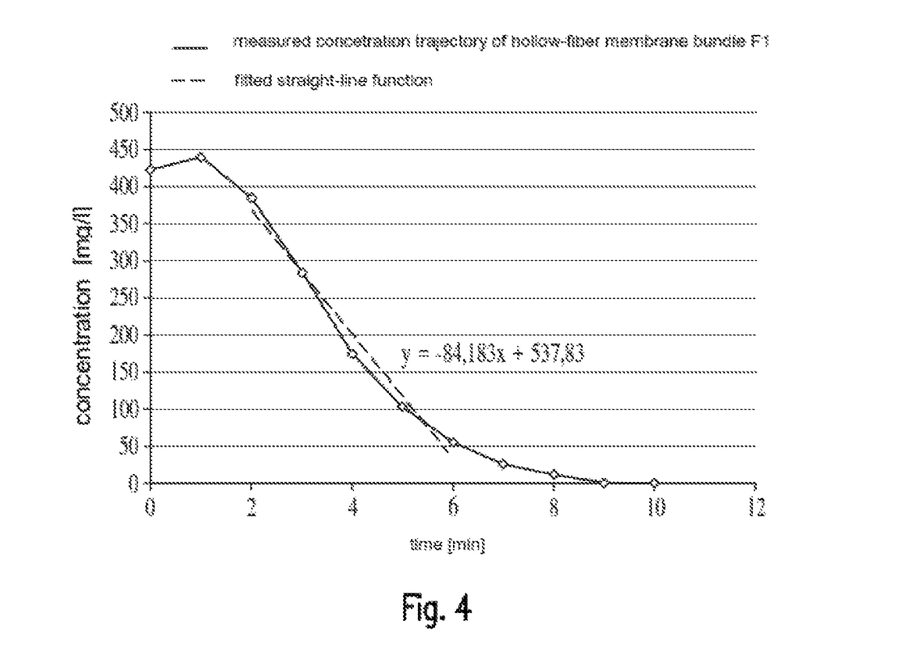
Figure 5:
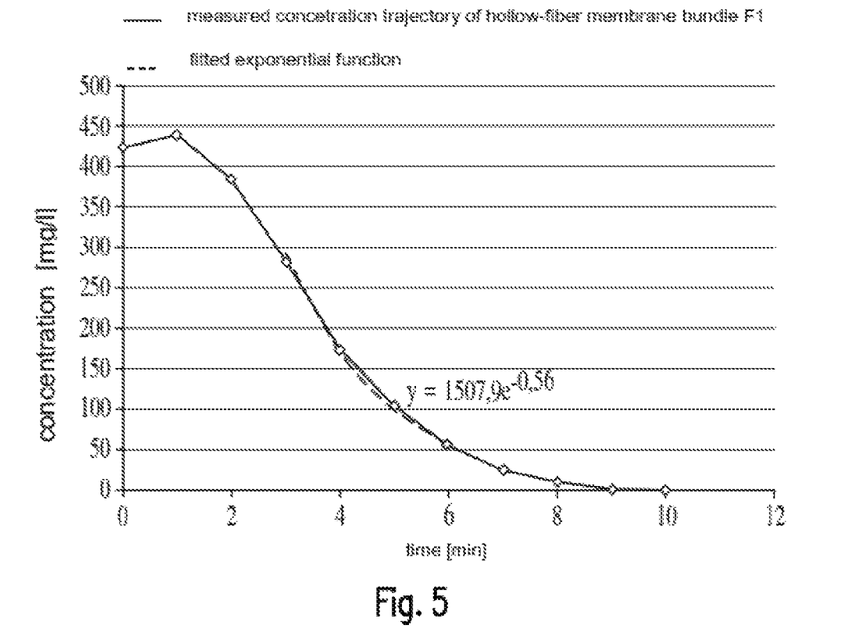
Figure 6:
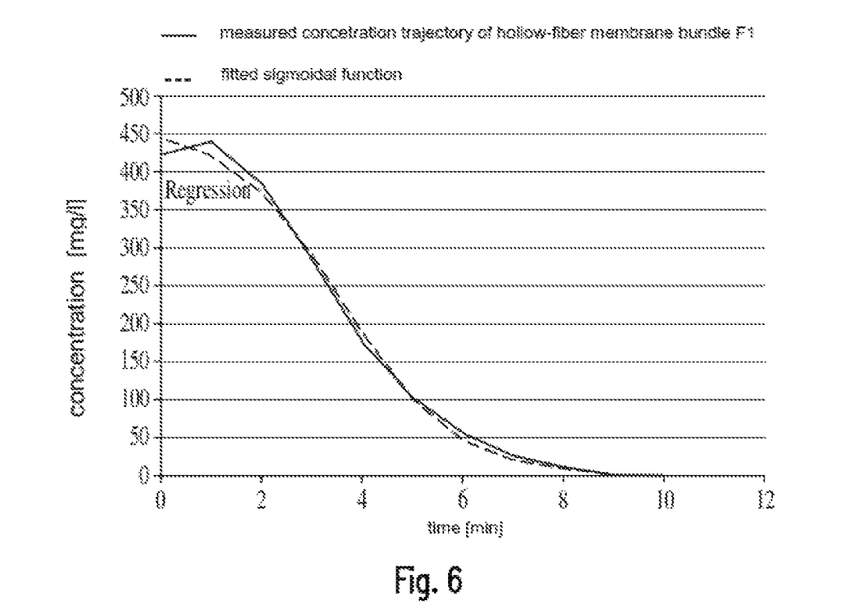

The following calibration parameters were quantified as per formulae 1 to 3 on hollow-fibre membrane bundles as per dialyzers F1 to F4. FIGS. 4 to 6 show the concentration trajectory recorded on hollow-fibre membrane bundle F1 and the mathematical functions fitted, wherefrom the parameters A2, B2 and C3 are quantified. Altogether, the parameters listed in Table 4 were quantified for the hollow-fibre membrane bundles F1 to F4:

TABLE 4

| Dialyzer | $A_2$ | $B_2$ | $C_3$ |
| --- | --- | --- | --- |
| F1 | 84 | 0.56 | 0.92 |
| F2 | 92 | 0.75 | 1.05 |
| F3 | 96 | 0.74 | 1.09 |
| F4 | 105 | 0.85 | 1.22 |

Combining the clearance values from Tab. 3 and Tab. 4 with the calibration parameters quantified makes it possible to establish corresponding calibration functions. These can be used to determine the clearance values of unknown hollow-fibre membranes provided the experimental and evaluative conditions are left unchanged. It transpires for the tested hollow-fibre membrane bundles F1 to F4 that it is particularly the mathematical fitting of the measured concentration trajectory with a sigmoid function according to FIG. 6 which is suitable for producing a calibration function.

Figure 7:
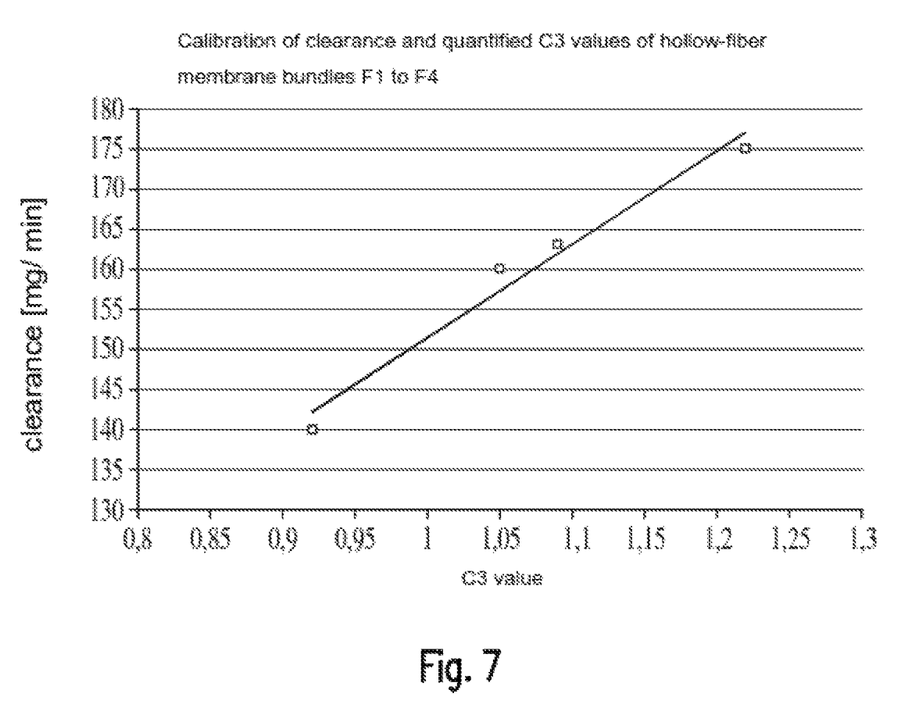

FIG. 7 shows a straight calibration line produced on the basis of the quantified C3 values from hollow-fibre membrane bundles F1 to F4.

LIST OF REFERENCE SYMBOLS (1) reservoir of distilled water
(2) receptacle containing test liquid
(3) pump
(4) housing
(5) hollow-fibre membrane bundle
   (5a) open end of fibre bundle
   (5b) closed end of fibre bundle
(6) liquid inlet
(7) annulus
(8) liquid outlet

The invention claimed is:

1. A method of determining at least one permeation property of hollow-fibre membranes, comprising the steps of:
(a) providing a hollow-fibre membrane bundle comprising a multiplicity of hollow-fibre membranes having a first end and a second end, wherein the lumens of the hollow-fibre membranes at the first end of the hollow-fibre membrane bundle are terminally open, and at the second end of the hollow-fibre membrane bundle are terminally closed,
(b) providing a housing having a first end and a second end for receiving the hollow-fibre membrane bundle, wherein the first end of the housing has at least one liquid inlet, and the second end of the housing has at least one liquid outlet,
(c) introducing the hollow-fibre bundle into the housing such that the first end of the hollow-fibre bundle having the terminally open lumen of the hollow-fibre membranes is oriented towards the at least one liquid inlet and the second end of the hollow-fibre membrane bundle having the terminally closed lumens of the hollow-fibre membranes is oriented towards the at least one liquid outlet,
(d) providing a first test liquid and a second test liquid, wherein at least the first or the second test liquid includes at least one test substance and the second test liquid differs from the first test liquid,
(e) filling the housing and/or the hollow-fibre membrane bundle by routing the first test liquid through the at least one liquid inlet at the first end of the housing into the interior of the housing and/or of the hollow-fibre membrane bundle/hollow-fibre membranes,
(f) inflowing a second test liquid through at least one liquid inlet at the first end of the housing into the interior of the housing and/or of the hollow-fibre membrane bundle,
(g) measuring the concentration of the at least one test substance, at one or more than one liquid outlet of the housing, while the second test liquid flows into the housing and/or the hollow-fibre membrane bundle through at least one liquid inlet.

2. The method according to claim 1, wherein the hollow-fibre membrane bundle has not been potted.

3. The method according to claim 1, wherein the at least one test substance is selected from salts, vitamins, uraemic metabolites, creatinine, phosphate, or proteins.

4. The method according to claim 1, wherein the flowrate at the at least one liquid outlet is in the range from 10 ml/min to 120 ml/min.

5. The method according to claim 1, wherein the hollow-fibre membrane bundle in the housing has a packing density of at least 20% to less than 80%.

6. The method according to claim 1, wherein the concentration of the at least one test substance is determined using electrochemical methods, such as conductivity measurement, or using amperometric, photometric, chromatographic or biochemical methods.

7. An apparatus for carrying out a method according to claim 1, comprising:
(i) at least one reservoir for receiving at least one liquid,
(ii) a measurement chamber comprising the housing having the first end and the second end for receiving the hollow-fibre membrane bundle,
(iii) at least one communication apparatus, and liquid communications for inflowing at least a first test liquid and at least a second test liquid from the at least one reservoir into the housing through the at least one liquid inlet on the first end of the housing,
(iv) at least one detector for detecting the concentration of the at least one test substance at the at least one liquid outlet at the second end of the housing.

8. The method according to claim 1, wherein the method further comprises the steps of:
(h) repeatedly or continuously measuring the concentration of the test substance at one or more than one liquid outlet of the housing during the inflow of the second test liquid into the housing and/or the hollow-fibre membrane bundle/hollow-fibre membranes, through at least one liquid inlet and recording a time-dependent concentration trajectory for at least one test substance at one or more than one liquid outlet,
(i) fitting a mathematical function to at least one portion of the at least one test substance's concentration trajectory recorded in step (h),
(j) determining a first parameter which is characterizing in respect of the mathematical function in the at least one portion of the concentration trajectory of the at least one test substance.

9. The method according to claim 8, wherein the mathematical function is a linear regression according to Equation 1:

$$Y = A_1 - A_2 \cdot t \qquad \text{Eq. 1}$$

or in that the mathematical function is an exponential function according to Equation 2:

$$Y = B_1 \cdot e^{-B_2 \cdot t} \qquad \text{Eq. 2}$$

or in that the mathematical function is a sigmoidal function according to Equation 3:

$$Y = \frac{C_1}{1 + e^{C_3 \cdot (t - C_2)}}, \qquad \text{Eq. 3}$$

wherein
  t is time in minutes,
  A1 relates to the intercept of a straight line according to Equation 1,
  A2 relates to the slope of the straight line,
  B1 relates to the pre-factor,
  B2 relates to the steepness of the curve,
  C1 relates to the starting point of the curve,
  C2 indicates the X-axis portion to the point of inflection, and
  C3 determines the slope at the point of inflection.

10. The method according to claim 8, wherein the curve slope of the fitted mathematical function in the selected portion of the concentration trajectory is enlisted to evaluate and determine the permeation property.

11. The method according to claim 8, wherein the method further comprises the step of:
(k) determining a second parameter which is characterizing in respect of the permeation property of the hollow-fibre membrane by means of the first parameter characterizing the mathematical function.

12. The method according to claim 11, wherein the second parameter which is characterizing in respect of the permeation property of the hollow-fibre membrane is the clearance which is determined, by means of calibration values, from the first parameter characterizing the mathematical function.

13. A method of producing hollow-fibre membrane filter modules, comprising the steps of
(a) defining at least one value range for at least one or more permeation properties of hollow-fibre membranes intended for the production of hollow-fibre membrane filter modules,
(b) selecting one or more manufacturing parameters to produce hollow-fibre membranes having the at least one or more permeation properties of the value range(s) defined in step (a),
(c) producing hollow-fibre membranes by a spinning process according to the one or more manufacturing parameters selected in step (b),
(d) bundling the hollow-fibre membranes obtained into hollow-fibre membrane bundles,
(e) carrying out a method of determining one or more permeation properties of the hollow-fibre membranes according to claim 1,
(f) using the hollow-fibre membrane bundles for the construction of filter modules once it has been ascertained that the one or more permeation properties fall within the at least one value range defined in step (a).

14. The method of producing hollow-fibre membrane filter modules according to claim 13, characterized by the step of adjusting the at least one or more selected manufacturing parameters from step (b) if it is found that the one or more permeation properties of the hollow-fibre membranes obtained do not fall within the at least one value range defined in step (a) so that the permeation properties of hollow-fibre membranes obtained are back within the at least one value range defined in step (a).

15. The method of producing hollow-fibre membrane filter module according to claim 13, wherein the spinning process comprises the production of hollow-fibre membranes consisting of a material comprising at least polysulphone and polyvinylpyrrolidone.

* * * * *